United States Patent
Yoneji et al.

(10) Patent No.: US 10,491,863 B2
(45) Date of Patent: Nov. 26, 2019

(54) VIDEO SURVEILLANCE SYSTEM AND VIDEO SURVEILLANCE DEVICE

(71) Applicant: Hitachi, Ltd., Chiyoda-ku, Tokyo (JP)

(72) Inventors: Kenichi Yoneji, Tokyo (JP); Daisuke Matsubara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 14/897,492

(22) PCT Filed: Jun. 14, 2013

(86) PCT No.: PCT/JP2013/066418
§ 371 (c)(1),
(2) Date: Dec. 10, 2015

(87) PCT Pub. No.: WO2014/199505
PCT Pub. Date: Dec. 18, 2014

(65) Prior Publication Data
US 2016/0127692 A1 May 5, 2016

(51) Int. Cl.
*H04N 7/18* (2006.01)
*G06K 9/00* (2006.01)

(52) U.S. Cl.
CPC ......... *H04N 7/181* (2013.01); *G06K 9/00664* (2013.01); *G06K 9/00744* (2013.01); *G06T 2207/30232* (2013.01)

(58) Field of Classification Search
CPC ......... G06T 19/006; G06T 2207/10012; G06T 7/73; G06T 19/003; G06T 3/00;
(Continued)

(56) References Cited

U.S. PATENT DOCUMENTS 5,850,352 A * 12/1998 Moezzi .................. G06T 15/10
345/419
5,912,700 A * 6/1999 Honey ............... A63B 71/0605
348/157
(Continued)

FOREIGN PATENT DOCUMENTS

EP        1 486 377 A2    12/2004
JP      2002-290962 A    10/2002
(Continued)

OTHER PUBLICATIONS

Sung-Mo Park and Joonwhoan Lee, "Object tracking in MPEG compressed video using mean-shift algorithm," Fourth ICICS-PCM 2003, Proceedings of the 2003 Joint, Singapore, 2003, pp. 748-752 vol. 2. (Year: 2003).*

(Continued)

*Primary Examiner* — Sath V Perungavoor
*Assistant Examiner* — Daniel Chang
(74) *Attorney, Agent, or Firm* — Crowell & Moring LLP

(57) ABSTRACT

A video surveillance system, including motion information from a plurality of surveillance cameras even when the installation conditions of the cameras are different, is equipped with an extraction unit which, upon receiving video images from the plurality of cameras, extracts motion feature quantities from a plurality of frames which constitute the video images, a storage unit for storing extraction results from the extraction unit, a conversion unit for converting the extracted motion feature quantities, and an analysis unit for analyzing the converted motion feature quantities, wherein the conversion unit retains virtual coordinate axes which are different from the coordinate axes of the plurality of cameras and converts the feature quantities by calculating virtual viewpoints on the virtual coordinate axes.

9 Claims, 9 Drawing Sheets

(58) Field of Classification Search
CPC ....... G06T 15/205; G06T 17/00; G06T 19/00;
G06T 7/70; G06T 7/74; G06T 15/00;
G06T 2207/30244; G06T 7/593; G06T
7/004; G06T 15/10; G06T 17/05; G06T
7/20; G06T 15/20; G06T 7/579; G06T
2207/30221; G06T 2207/30236; G06T
7/248; H04N 13/0239; H04N 5/265;
H04N 5/2224; H04N 5/232; H04N
7/17318; H04N 5/222; H04N 7/181;
G06F 17/3079; G01S 3/7864; G01C
11/02; G06N 3/006; G06K 9/00335;
A61B 2090/365; A61B 1/0005; A63B
71/0605
USPC .......... 345/419, 420, 633; 348/47, 143, 157,
348/159, 169, 239, 135; 701/2, 21;
725/105, 114; 382/103
See application file for complete search history.

(56) References Cited

U.S. PATENT DOCUMENTS

| | | | |
|---|---|---|---|
| 6,567,116 B1* | 5/2003 | Aman | A63B 24/0021 348/164 |
| 2002/0122115 A1* | 9/2002 | Harmath | A63B 71/0605 348/157 |
| 2003/0023595 A1* | 1/2003 | Carlbom | G06F 17/3079 |
| 2003/0030734 A1* | 2/2003 | Gibbs | H04N 5/2224 348/239 |
| 2003/0179294 A1* | 9/2003 | Martins | G01S 3/781 348/157 |
| 2004/0032495 A1* | 2/2004 | Ortiz | H04N 5/232 348/157 |
| 2007/0279494 A1* | 12/2007 | Aman | G01S 3/7864 348/169 |
| 2007/0296721 A1 | 12/2007 | Chang et al. | |
| 2007/0296815 A1* | 12/2007 | Isaksson | G06T 7/20 348/157 |
| 2008/0060034 A1* | 3/2008 | Egnal | G01C 11/02 725/105 |
| 2009/0027494 A1* | 1/2009 | Cavallaro | G06K 9/6202 348/135 |
| 2009/0113505 A1* | 4/2009 | Yu | H04N 7/17318 725/114 |
| 2009/0128549 A1* | 5/2009 | Gloudemans | G06T 15/20 345/419 |
| 2009/0147992 A1* | 6/2009 | Tong | G06K 9/00335 382/103 |
| 2009/0315978 A1 | 12/2009 | Wuermlin et al. | |
| 2010/0026809 A1* | 2/2010 | Curry | H04N 5/222 348/157 |
| 2011/0032361 A1* | 2/2011 | Tamir | H04N 7/181 348/157 |
| 2011/0043627 A1* | 2/2011 | Werling | G06T 17/05 348/143 |
| 2011/0242326 A1* | 10/2011 | Essa | G06N 3/006 348/157 |
| 2011/0254973 A1 | 10/2011 | Nishiyama | |
| 2011/0298988 A1* | 12/2011 | Kawai | G06T 5/006 348/699 |
| 2012/0045091 A1* | 2/2012 | Kaganovich | G06T 7/579 382/103 |
| 2013/0114851 A1* | 5/2013 | Foote | G06T 7/004 382/103 |

FOREIGN PATENT DOCUMENTS

| | | |
|---|---|---|
| JP | 2011-193187 A | 9/2011 |
| JP | 2011-228846 A | 11/2011 |

OTHER PUBLICATIONS

Wang Y. Distributed Multi-Object Tracking with Multi-Camera Systems Composed of Overlapping and Non-Overlapping Cameras in Graduate College 2013 University of Nebraska p. 183 (Year: 2013).*

Raptis et al. "Tracklet Descriptors for Action Modeling and Video Analysis", In Proceedings of the European Conference on Computer Vision, Sep. 2010, pp. 1-14, (Fourteen (14) pages).

Baker et al. "Lucas-Kanade 20 Years On: A Unifying Framework: Part 1", International Journal of Computer Vision, vol. 53, No. 3, 2004, pp. 1-47, (Forty-Eight (48) pages).

International Search Report (PCT/ISA/210) issued in counterpart International Application No. PCT/JP2013/066418, with English translation (Three (3) pages).

T. Bebie et al., "A Video-Based 3D-Reconstruction of Soccer Games," Computer Graphics Forum, Aug. 21, 2000, pp. C391-C400, vol. 19, No. 3, Wiley-Blackwell Publishing Ltd., Great Britain, XP008015195.

Extended European Search Report issued in counterpart European Application No. 13886651.2 dated Jan. 4, 2017 (thirteen (13) pages).

* cited by examiner

VIDEO SURVEILLANCE SYSTEM AND VIDEO SURVEILLANCE DEVICE

TECHNICAL FIELD

The present invention relates to a technique for surveying a surveillance target by using a video image.

BACKGROUND ART

In recent years, with an increase in number of heinous crimes, the awareness about security is increasing. Accordingly, at places such as outlets or airports having lots of traffic, surveillance cameras an installed. Video information obtained by shooting by the surveillance cameras are stored in an accumulation device such as a surveillance recorder and browsed as needed.

Patent Literature 1 (described below) describes a surveillance system using a plurality of surveillance cameras. In this literature, pieces of motion information of a surveillance target is extracted, and the pieces of extracted motion information are compared with each other among the plurality of cameras to obtain information of the surveillance target.

CITATION LIST

Patent Literature

PTL 1: Japanese Patent Application Laid-Open No. 2011-193187

Non-Patent Literature

Non-PTL 1: Michalis Raptis and Stefano Soatto, "Tracklet Descriptors for Action Modeling and Video Analysis", In Proceedings of the European Conference on Computer Vision, September 2010.
Non-PTL 2: S. Baker and I. Matthews "Lucas-kande 20 years on: A unifying framework", International Journal of Computer Vision, vol. 53, no. 3, 2004.

SUMMARY OF INVENTION

Technical Problem

In a surveillance system including a plurality of surveillance cameras, when pieces motion information obtained by the plurality of surveillance cameras are compared with each other among the cameras, differences between installation conditions of the cameras need to be considered. For example, when a system which extracts pieces of motion information from the plurality of surveillance cameras to search for a person acting the same motion is constructed, the system can be achieved by the scheme according to the Non-PTL 1 or the like when the plurality of cameras are installed under the same conditions. However, when the installation conditions of the cameras are different from each other, for example, when a camera installed in parallel to the ground, a camera installed toward the ground, and the like are mixed with each other, ways of imaging the target are different from each other among the cameras. For this reason, even though a person makes the same motion, different pieces of motion information are obtained to make it difficult to compare the pieces of motion information among the cameras.

To face the problem, in the PTL 1 described above, after motion information obtained from a certain camera is converted into coordinate positions on a coordinate system of a camera to be compared, the coordinate positions are compared with each other. However, according to this scheme, since position information is converted into coordinate positions of the camera to be compared, and the coordinate positions are compared with each other. Thus, unless fields of view of the cameras to be compared with each other overlap, the coordinate positions cannot be compared with each other.

The present invention has been made to solve the problem described above, and has as its object to provide a video surveillance technique which can compare pieces of motion information obtained from a plurality of surveillance cameras even though installation conditions of the cameras are different from each other.

Solution to Problems

The present invention provides a video surveillance system according to the present invention including an extraction unit which receives video images from a plurality of cameras and extracts motion feature quantities from a plurality of frames constituting the video images, a storage unit for accumulating extraction results from the extraction unit, a conversion unit for converting the extracted motion feature quantities, and an analysis unit for analyzing the converted motion feature quantities, wherein the conversion unit retains virtual coordinate axes different from coordinate axes of the plurality of cameras and calculates virtual viewpoints on a virtual coordinate system to convert the feature quantities.

Advantageous Effects of Invention

According to the video surveillance device according to the present invention, pieces of motion information of a surveillance target obtained from a plurality of surveillance cameras having different installation conditions can be preferably analyzed.

DESCRIPTION OF EMBODIMENTS

First Embodiment

Figure 1:
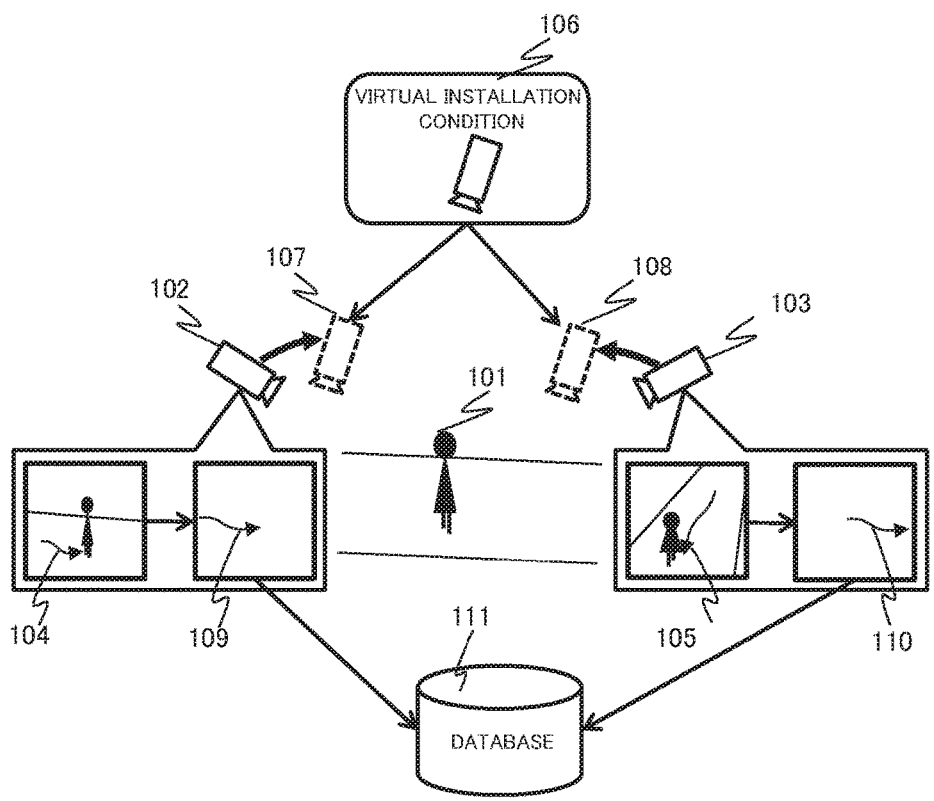
FIG. 1 is a schematic diagram of a surveillance system according to a first embodiment.

FIG. 1 is a schematic diagram of a surveillance system according to a first embodiment of the present invention. In FIG. 1, a surveillance target 101 being in a surveillance region is surveyed by a plurality of surveillance cameras (102, 103).

Image processing is performed to extract motion feature quantities (104, 105) of the surveillance target from video images obtained by the surveillance cameras. The motion feature quantity is a feature quantity which can express a moving distance of a target. For example, within a predetermined period of time, a motion vector or the like obtained by aligning movements of coordinates obtained when the surveillance target moves in a screen is used. A moving distance of the target may be calculated by using a method or the like as described in Non-PTL 2.

The motion feature quantities (104, 105) respectively obtained by the cameras cannot be easily compared with each other because the installation states of the cameras are different from each other. The installation states of the cameras mentioned here include, for example, heights of the cameras from the ground level, installation angles with respect to the ground level, directions of the cameras (directions of sight lines), field angles of the cameras, focal distances of the cameras, and the like. Thus, a virtual installation state 106 unified in the entire surveillance system is given, and virtual viewpoints (107, 108), at which the installation states of the cameras are matched with the installation state of the camera in the virtual installation state 106, are set. According to the set virtual viewpoints, methods of conversion from each of the image coordinate systems of the cameras into each of the coordinate systems at the virtual viewpoints are determined. According to the conversion methods, the motion feature quantities (104, 105) are converted to obtain converted motion feature quantities (109, 110). As the methods of converting the coordinate systems, a method of converting coordinate positions of, for example, a motion vector by coordinate conversion using a rotating matrix or the like may be used. Since the converted motion feature quantities (109, 110) are motion feature quantities in the same installation state in all the cameras, the motion feature quantities can be easily compared with each other. The obtained motion feature quantities (109, 110) are stored in a database 111 or the like and used in analysis.

Figure 2:
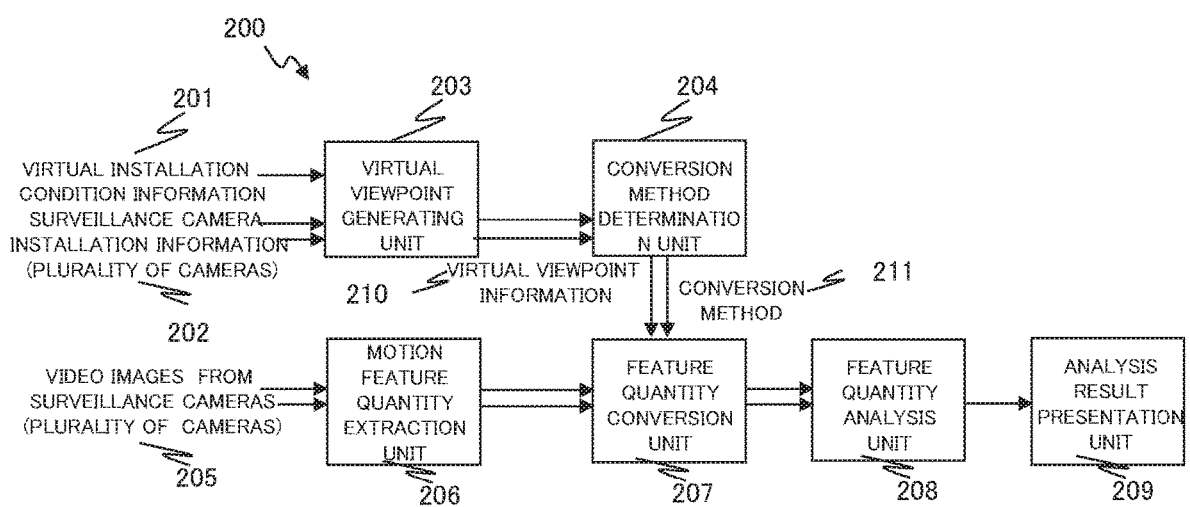
FIG. 2 is a functional block diagram of a video surveillance device 200 included in the surveillance system according to the first embodiment.

FIG. 2 is a functional block diagram of a video surveillance device 200 included in the surveillance system according to the first embodiment. The video surveillance device 200 includes a virtual viewpoint generation unit 203, a conversion method determination unit 204, a motion feature quantity extraction unit 206, a feature quantity conversion unit 207, a feature quantity analysis unit 208, and an analysis result presentation unit 209.

The virtual viewpoint generation unit 203 receives virtual installation state information 201 given in advance and pieces of surveillance camera installation information of a plurality of cameras. The virtual viewpoint generation unit 203, on the basis of the received virtual installation state information 201 and the pieces of surveillance camera installation information of the plurality of cameras, generates virtual viewpoint information 210 for each of the surveillance cameras. The pieces of generated virtual viewpoint information 210 are input to the conversion method determination unit 204. The conversion method determination unit 204, on the basis of the pieces of input virtual viewpoint information 210, determines a method of converting a feature quantity. A determined conversion method 211 is input to the feature quantity conversion unit 207.

The motion feature quantity extraction unit 206 receives video images 205 of the plurality of surveillance cameras. The motion feature quantity extraction unit 206 performs image processing to the received video images 205 from the surveillance cameras to extract motion feature quantities of the surveillance target. The motion feature quantities may be extracted by using the method according to Non-PTL 2 or the like. The motion feature quantity is constituted by position information on an image from which the feature quantity is extracted and a feature quantity expressing a motion. As the feature quantity expressing a motion, a feature quantity obtained by aligning, for example, moving distances (two-dimensional vectors) on, for example, an image coordinate system in a direction along a time axis or the like is given. The extracted motion feature quantity is input to the feature quantity conversion unit 207. The feature quantity conversion unit 207 receives the motion feature quantities and the feature quantity conversion method 211, and, according to the feature quantity conversion method, converts the motion feature quantities. The converted motion feature quantities are input to the feature quantity analysis unit 208.

The feature quantity analysis unit 208 analyzes the converted motion feature quantities. The analysis result is input to the analysis result presentation unit 209. The analysis result presentation unit 209 converts the analysis result such that the analysis result can be presented to a surveillant and presents the analysis result. As an example of the feature quantity analysis unit 208, for example, processing or the like, which searches past motion feature quantities for targets making similar motions and rearranges the targets in descending order of similarity, is conceived. In this case, in the analysis result presentation unit 209, processing or the like, which sequentially lists times of days, places, and the like at which the found motion feature quantities are extracted and displays the list on a display terminal, is performed. In this case, as the processing of the feature quantity analysis unit 208, another analysis processing may be executed as long as the analysis processing uses a motion feature quantity. As the presentation method of the analysis result presentation unit 209, another presentation method may be used as long as the presentation method can present an analysis result in the feature quantity analysis unit 208.

Figure 3:
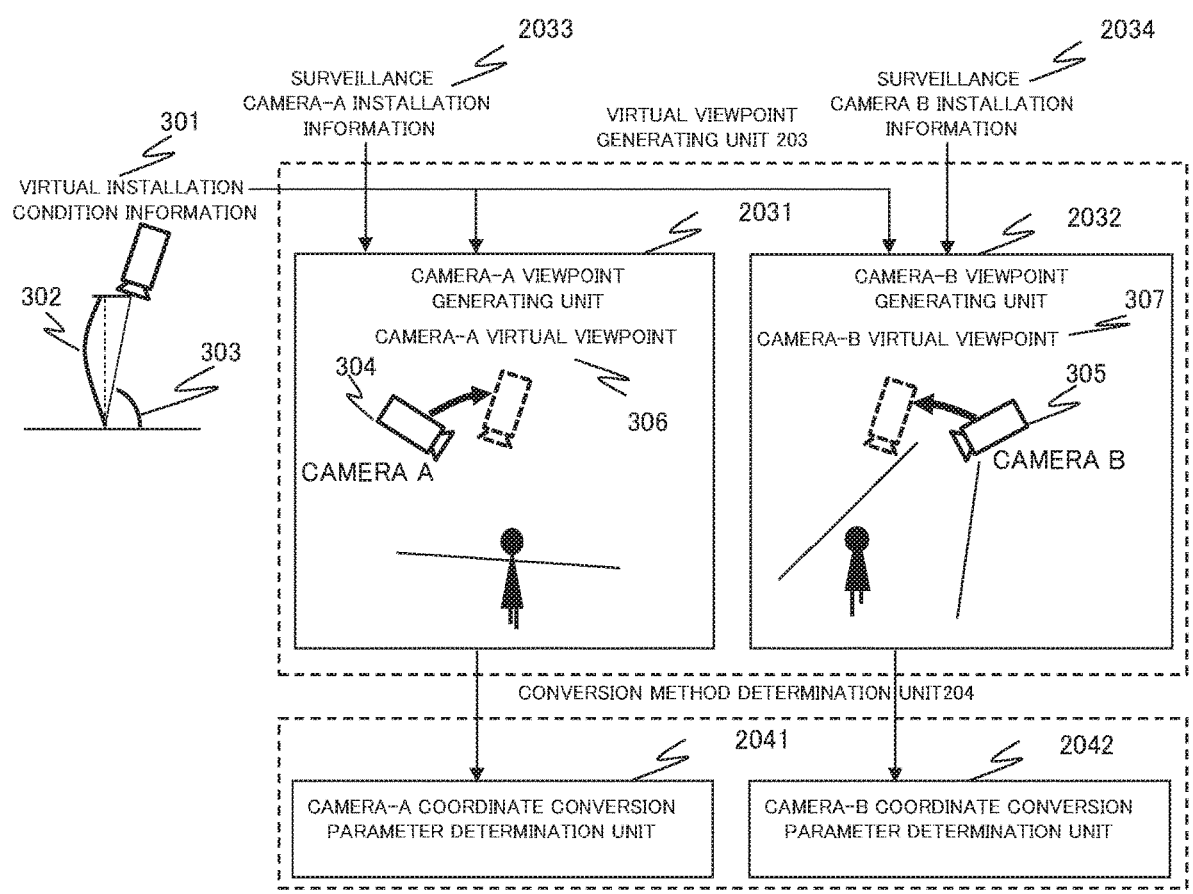
FIG. 3 is a functional block diagram showing configurations of a virtual viewpoint generation unit 203 and a conversion method determination unit 204.

FIG. 3 is a functional block diagram showing configurations of the virtual viewpoint generation unit 203 and the conversion method determination unit 204. In this example, two cameras are used, and the cameras are defined as a camera A 304 and camera B 305, respectively.

A virtual installation state information 301 is given in advance. An example in which a height 302 from the ground level and an angle 303 with respect to the ground level are given as virtual installation states will be described here. The virtual viewpoint generation unit 203 includes a camera-A viewpoint generation unit 2031 and a camera-B viewpoint generation unit 2032. In the camera-A viewpoint generation unit 2031, a camera-A virtual viewpoint 306 is calculated by using the virtual installation state information 301 and the camera-A installation state 2033. Similarly, in the camera-B viewpoint generation unit 2032, a camera-B virtual viewpoint 307 is calculated by using the virtual installation state information 301 and the camera-B installation state 2034.

The conversion method determination unit 204 includes a camera-A coordinate conversion parameter determination unit 2041 and a camera-B coordinate conversion parameter determination unit 2042. In the camera-A coordinate conversion parameter determination unit 2041, by using the camera-A virtual viewpoint 306 generated by the camera-A viewpoint generation unit 2031, parameters of coordinate conversion from the camera A 304 to the camera-A virtual viewpoint 306 are calculated. The coordinate conversion parameters are, for example, coefficients or the like of a normal coordinate conversion matrix. The coefficients of the coordinate conversion matrix can be easily calculated by using a translational moving distance from an installation position of the camera A 304 to the virtual viewpoint 306 and a rotating angle from an installation angle of the camera A 304 to an installation angle of the virtual installation state information 301. The field angles and the focal distances of the cameras may be included in the virtual installation states. In this case, the coefficients of a coordinate conversion matrix obtained in consideration of the field angles and the focal distances of the cameras may be calculated. Similarly, in the camera-B coordinate conversion parameter determination unit 2042, parameters of coordinate conversion from the camera B 305 to the camera B virtual viewpoint 307 are calculated. The coordinate conversion parameters obtained as described above are input to the feature quantity conversion unit 207.

Figure 4:
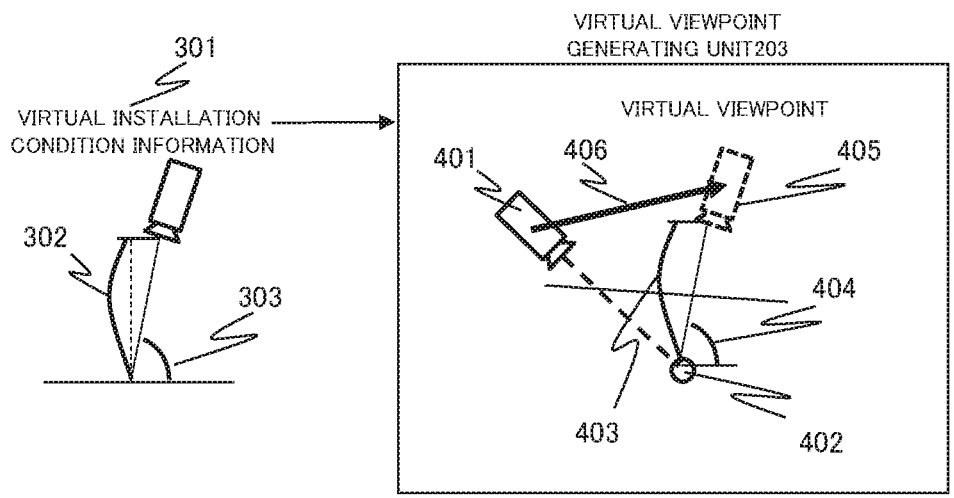
FIG. 4 is a diagram showing a process of a virtual viewpoint generation unit 203.

FIG. 4 is a diagram showing an example of a method of calculating a virtual viewpoint in the virtual viewpoint generation unit 203. On the basis of installation information of each of the surveillance cameras 401, a crossing point 402 between a sight line of each of the cameras and the ground level is calculated. Of installation positions each of which has the calculated crossing point 402 as the center of the sight line, a position having a height equal to the height of the virtual installation state 301 from the ground level and an angle 404 equal to the angle 303 of the virtual installation state 301 with respect to the ground level is defined as a virtual viewpoint 405. A difference between the virtual viewpoint and the installation position of the camera 401 is a translational moving distance 406 from the camera 401 to the virtual viewpoint 405. In this example, conversion is performed such that the crossing point 402 between the sight line of the camera from the virtual viewpoint 405 and the ground level is matched with the crossing point 402 between the sight line of the original camera 401 and the ground level. In this manner, since a motion feature quantity of a target appearing near the center on an image of the original camera 401 is a motion feature quantity near the center on an image obtained even at the virtual viewpoint, the motion feature quantity can be advantageously easily handled in an analysis (will be described later). In this example, although directions of the cameras (directions of sight lines) are not especially designated, the directions of the cameras may be designated as the virtual installation states to calculate a virtual viewpoint such that the cameras face the virtual viewpoint.

Figure 5:
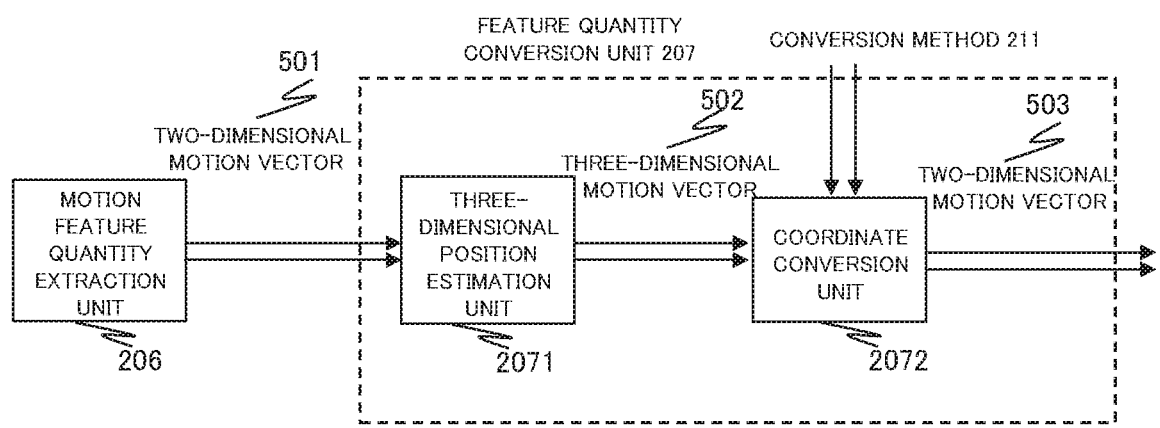
FIG. 5 is a functional block diagram showing a configuration of a feature quantity conversion unit 207.

FIG. 5 is a functional block diagram showing a configuration of the feature quantity conversion unit 207. This drawing shows an example in which the motion feature quantity extracted by the motion feature quantity extraction unit 206 is expressed by a two-dimensional motion vector 501 corresponding to image coordinates. The feature quantity conversion unit 207 includes a three-dimensional position estimation unit 2071 and a coordinate conversion unit 2072.

The feature quantity includes a two-dimensional position on the image coordinate system from which the feature quantities are extracted as described above and feature quantities expressing a motion. In the three-dimensional position estimation unit 2071, first, the two-dimensional position on the image coordinate system from which the feature quantities are extracted is converted into a three-dimensional position in a real space. This conversion can be easily calculated when an angle of field of the camera, a focal distance of the camera, a height of the camera from the ground level, an angle of the camera with respect to the ground level, and a height of the feature quantity in the real space are known. The angle of field of the camera, the focal distance of the camera, the height of the camera from the ground level, and the angle of the camera with respect to the ground level are set in advance. In this state, when the height of the feature quantity in the real space is known, the two-dimensional position on the image coordinate system from which the feature quantity is extracted can be converted into a three-dimensional position in the real space. More specifically, the height of the extraction position of the feature quantity in the real space is estimated to make it possible to convert the two-dimensional position of the extraction position into a three-dimensional position in the real space.

In the estimation of the height of the feature quantity, for example, an estimating method using the following relationship between a surveillance target and the ground is employed. When a person is the surveillance target, a person region is extracted by using a person extraction process or the like. If the extracted person is assumed to stand on the ground, a foot level of the person is equal to the ground level. Furthermore, it is assumed that the height of the extracted person is a predetermined value to make it possible to obtain height information of the feature quantity included in the person region. In this manner, the three-dimensional position of the extraction position of each feature quantity can be estimated. In the person extraction process, for example, a method such as template matching may be used. Similarly, the process described above is performed to each element of the two-dimensional motion vector of the feature quantity to convert the feature quantity into a three-dimensional motion vector 502.

In the coordinate conversion unit 2072, according to the conversion method 211 obtained by the conversion method determination unit 204, coordinate conversion is performed. In this example, coordinate conversion using a matrix for converting a three-dimensional position in a real space into a two-dimensional coordinate position of a virtual image viewed from a virtual viewpoint is used as the conversion method 201. By using the coordinate conversion matrix, the three-dimensional motion vector 502 converted into a vector at the three-dimensional position is converted into a two-dimensional motion vector 503 viewed from the virtual viewpoint. As described above, the original feature quantity is converted into a feature quantity viewed from the virtual viewpoint.

In this example, the conversion method used when a feature quantity is a two-dimensional motion vector is shown. However, when a feature quantity is not given as a two-dimensional vector at a coordinate position on an image like a motion direction histogram, another conversion method is required. In this case, for example, as the conversion method, a method of converting a histogram by using a conversion table associated with information of a height of a feature quantity from the ground level or the like may be used.

Figure 6:
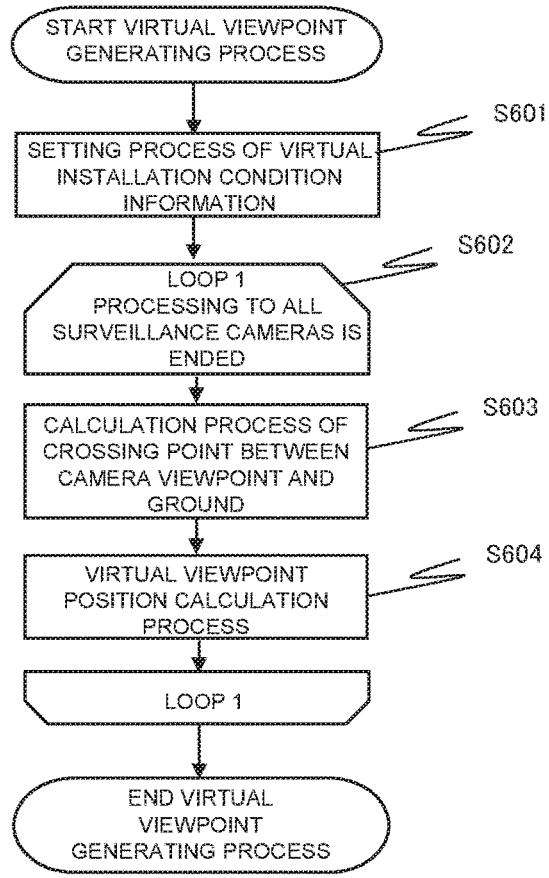
FIG. 6 is a processing flow chart of the virtual viewpoint generation unit 203.

FIG. 6 is a process flow chart of a virtual viewpoint generation process in the virtual viewpoint generation unit 203. Steps in FIG. 6 will be described below.

(FIG. 6: Steps S601 to S602)

When the virtual installation state information 201 is set (S601), the virtual viewpoint generation unit 203 executes steps S603 to S604 (will be described later) with respect to all the cameras (S602).

(FIG. 6: Steps S603 to S604)

The virtual viewpoint generation unit 203 calculates, on the basis of the installation information 202 of a surveillance camera, a crossing point between a sight line of the camera and the ground level (S603). A virtual viewpoint position is calculated by using the obtained crossing point (S604).

Figure 7:
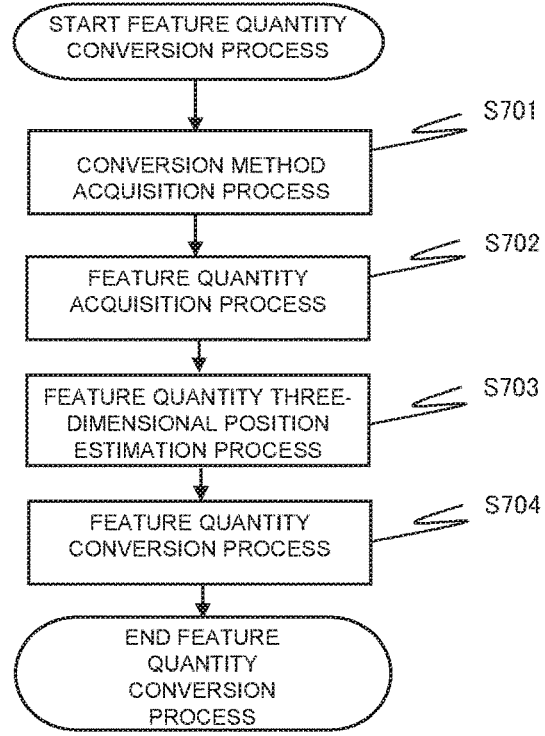
FIG. 7 is a processing flow chart of the feature quantity conversion unit 207.

FIG. 7 is a process flow chart of a feature quantity conversion process in the feature quantity conversion unit 207. In the feature quantity conversion process, a conversion method is acquired first (S701). A feature quantity is acquired (S702). A three-dimensional position of the feature quantity is estimated (S703). On the basis of the conversion method acquired in (S701), the feature quantity is converted (S704) to end the feature quantity conversion process.

Figure 8:
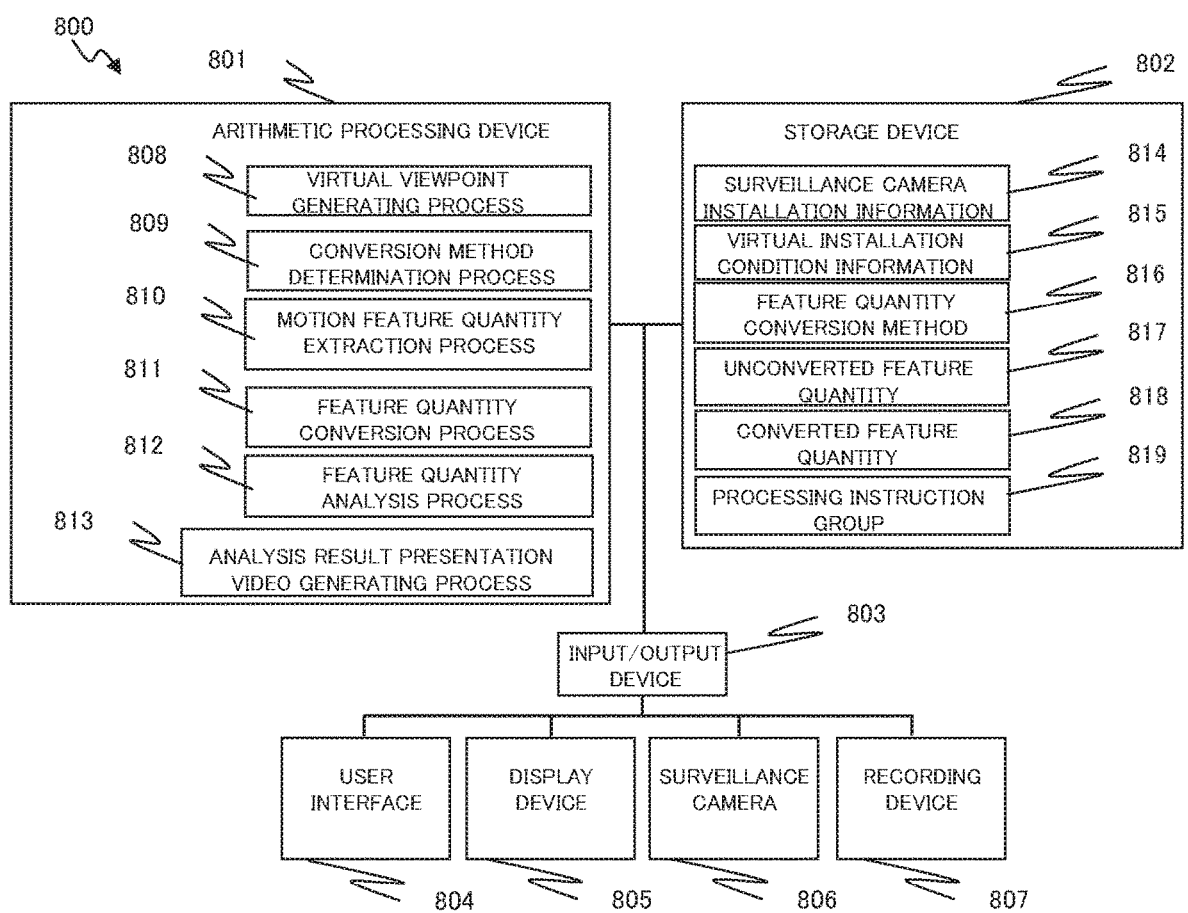
FIG. 8 is a diagram showing a configuration of a video surveillance device according to the first embodiment.

FIG. 8 shows a configuration of a surveillance device 800 according to the first embodiment. The surveillance device 800 includes an arithmetic processing device 801, a recording device 802, and input/output device 803. The arithmetic processing device 801 and the recording device 802 are connected to a user interface 804, a display device 805, a surveillance camera 806, and a recording device 807 through the input/output device 803. The arithmetic processing device 801 calls required processes from a processing instruction group 819 stored in the recording device 802 and executes the processes. A virtual viewpoint generation process 808, a conversion method determination process 809, a motion feature quantity extraction process 810, a feature quantity conversion process 811, and a feature quantity analysis process 812 execute processes corresponding to the virtual viewpoint generation unit 203, the conversion method determination unit 204, the motion feature quantity extraction unit 206, the feature quantity conversion unit 207, and the feature quantity analysis unit 208, respectively. Surveillance camera setting information 814 and virtual installation state information 815 are set through the user interface 804 and stored in the recording device 802. The virtual viewpoint generation process 808 calls the surveillance camera setting information 814 and the virtual installation state information 815, generates a virtual viewpoint, and subsequently executes the conversion method determination process 809. The conversion method determination process 809 determines a feature quantity conversion method 816 and stores the feature quantity conversion method 816 in the recording device 802. In the motion feature quantity extraction process 810, an image is read from the surveillance camera 806 or the recording device 807, and a motion feature quantity is extracted and stored as an unconverted feature quantity 817 in the recording device 802. The feature quantity conversion process 811 reads the feature quantity conversion method 816 and the unconverted feature quantity 817, converts the feature quantity, and stores the converted feature quantity as a converted feature quantity 818 in the recording device. The feature quantity analysis process 812 reads the converted feature quantity 818 and performs a feature quantity analysis process. An analysis result presentation video generation process 813 is executed. In the analysis result presentation video generation process 813, an analysis result of the feature quantity analysis process 812 is converted into a video image of a video format in which the video image can be displayed by the display device 805, and the video image is sent to the display device 805. The display device 805 displays the transmitted analysis result video image.

Figure 9:
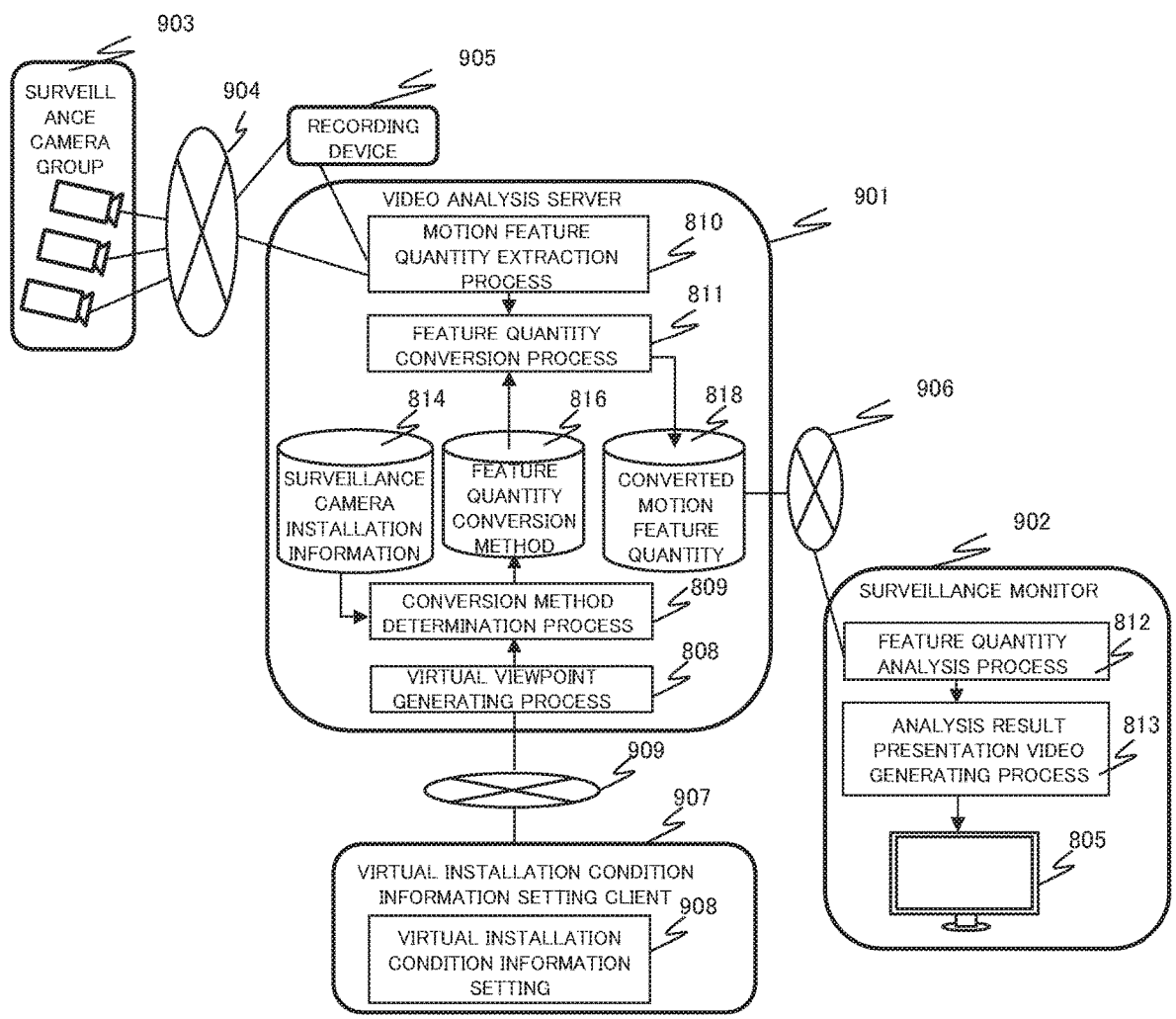
FIG. 9 is a diagram showing a configuration of a surveillance system according to the first embodiment.

FIG. 9 is a diagram showing a configuration of a surveillance system according to the first embodiment. The video surveillance device 200 can be configured as a video analysis server 901, a surveillance monitor 902, and software equipped with functional units. A surveillance camera group 903 is connected to the video analysis server 901 and a recording device 905 through a network 904. The surveillance monitor 902 is a display device which displays an analysis result of a motion feature quantity, and is connected to the video analysis server 901 through a network 906. The virtual installation state information setting client 907 is a user interface 804 which can perform virtual installation state information setting 908 to determine a virtual viewpoint, and is connected to the video analysis server 901 through a network 909. A video image from the surveillance camera group 903 and a video image from the recording device 905 are input to the video analysis server 901 through the network 904. Virtual installation state information set by the virtual installation state setting client 907 is input to the video analysis server 901 through the network 909. In the video analysis server 901, the processes described in FIG. 2 to FIG. 5 are performed to accumulate the converted motion feature quantity 818. The accumulated converted motion feature quantity 818 is input to the surveillance monitor 902 through the network 906 and subjected to an analysis process. Thereafter, the result is displayed on the display device 805.

In FIG. 9, although the feature quantity extraction process is performed in the video analysis server 901, the feature quantity extraction process may be performed in each of the cameras of the surveillance camera group. Although the feature quantity analysis process is performed in the surveillance monitor 902, the feature quantity analysis process is performed in the video analysis server 901, and the results may be accumulated. Although the virtual installation state information setting 908 is performed in the virtual installation state information setting client 907, the virtual installation state information setting may be performed such that an input/output terminal is directly connected to the video analysis server 901.

Figure 10:
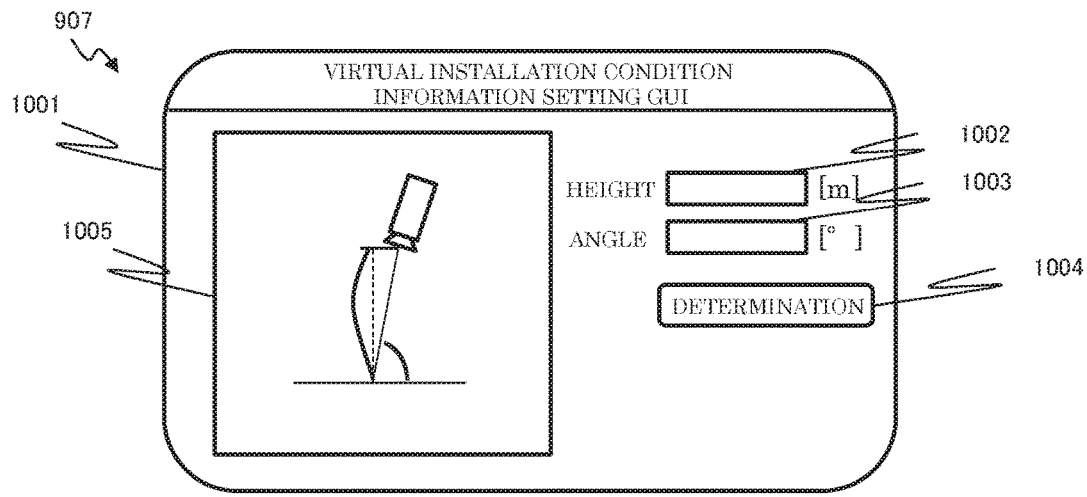
FIG. 10 is a diagram showing an example of a virtual installation state information setting client 907.

FIG. 10 is a diagram showing an example of a virtual installation state information setting GUI in the virtual installation state information setting client 907. The virtual installation state information setting GUI is provided as an input window like a virtual installation state information setting GUI 1001. This GUI includes input boxes (1002, 1003) to which virtual installation state information can be input. The example in FIG. 10 shows an example in which a height and an angle can be set. The GUI includes a determination button 1004 to reflect an input value. The determination button 1004 is pressed to determine a virtual installation state used in this surveillance system. The GUI includes a window 1005 which shows a virtual installation state at present. This example is only an example, pieces of virtual installation state information which can be set may be arbitrarily increased or reduced, a present state may be displayed with a text in place of the window 1005, or the window 1005 may be eliminated. In place of the determination button, a function of automatically transmitting a setting content at predetermined timings may be included. The virtual installation state may be not only set by a method in which the state can be freely input as in this example, but also set by selecting several candidates. Alternatively, one of cameras which have been installed may be selected, and an installation state of the camera may be used as the virtual installation state.

In this manner, the surveillance system according to the first embodiment is characterized by including an extraction unit which receives video images from a plurality of cameras and extracts motion feature quantities from a plurality of frames configurating the video images, a storage unit which accumulates extraction results from the extraction unit, a conversion unit which converts the extracted motion feature quantities, and an analysis unit which analyzes the converted motion feature quantities, wherein the conversion unit retains virtual coordinate axes different from coordinate axes of the plurality of cameras and calculates a virtual viewpoint on the virtual coordinate system to convert the feature quantities.

With the characteristics, pieces of motion information extracted from the plurality of surveillance cameras having different installation conditions can be appropriately compared with each other.

Second Embodiment

Figure 11:
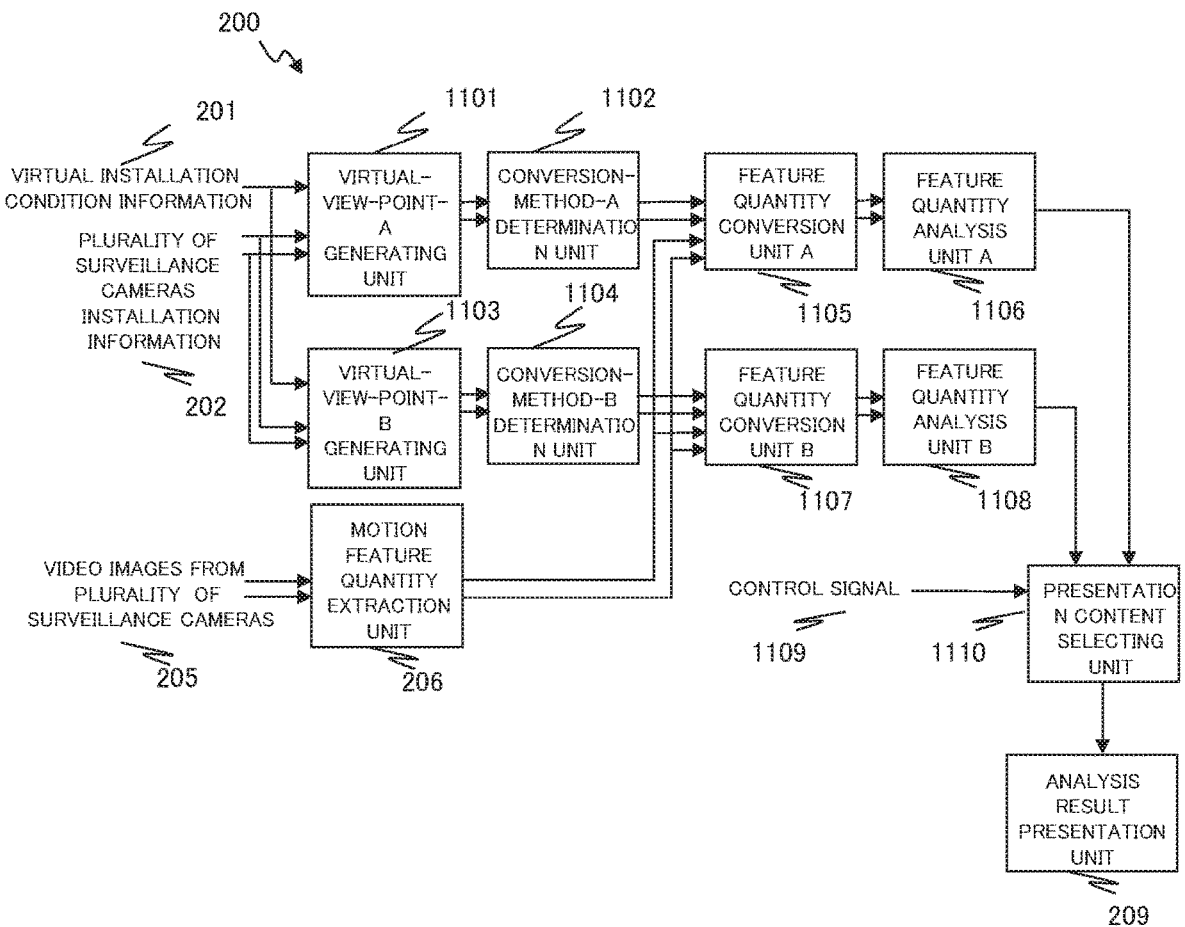
FIG. 11 is a functional block diagram of a video surveillance device 200 according to a second embodiment.

FIG. 11 is a functional block diagram of the video surveillance device 200 according to a second embodiment of the present invention. The second embodiment will explain an example in which a plurality of analysis processes are performed in the first embodiment. Since the other configuration of the second embodiment is the same as that in the first embodiment, different points will be mainly described below.

The example in which the plurality of analysis processes are performed in a surveillance device shown in FIG. 2 is shown in FIG. 11. In FIG. 11, a case which uses analysis processes of two types will be described. Virtual installation states required in the analysis processes (1106, 1108) are set in the pieces of virtual installation state information 201 in advance, and the pieces of virtual installation state information 201 are input to a virtual viewpoint generation unit A 1101 and a virtual viewpoint generation unit B 1103, respectively. In the virtual viewpoint generation unit A 1101 and the virtual viewpoint generation unit B 1103 are different from each other in only the virtual installation states. As process contents, the same processes as those in the virtual viewpoint generation unit 203 described in the first embodiment are performed in both the virtual viewpoint generation unit A 1101 and the virtual viewpoint generation unit B 1103. By using pieces of virtual viewpoint information obtained by the above processes, in a conversion method A determination unit 1102 and a conversion method B determination unit 1104, feature quantity conversion methods used in a feature quantity conversion unit A 1105 and a feature quantity conversion unit B 1107 are determined, respectively. For the process contents of the conversion method A determination unit 1102 and the conversion method B determination unit 1104, the same process as that in the conversion method determination unit 204 described in the first embodiment is performed. The feature quantity conversion unit A 1105 and the feature quantity conversion unit B 1107, according to the determined conversion methods, convert the motion feature quantities extracted by the motion feature quantity extraction unit 206, respectively.

The feature quantity analysis unit A 1106 and the feature quantity analysis unit B 1108 perform analysis processes by using the converted feature quantities, respectively. A control signal 1109 is input to the presentation content selection unit 1110. The control signal 1109 is a control signal used to designate an analysis result desired to be presented on the analysis result presentation unit 209. According to the control signal, of analysis results of the feature quantity analysis unit A and the feature quantity analysis unit B, an analysis result to be input to the analysis result presentation unit 209 is selected.

For example, when both a result obtained by analysis performed at a viewpoint at which a target is just viewed from above and a result obtained by analysis performed at a viewpoint at which the target is just viewed from a lateral side are required, the feature quantity conversion unit A 1105 converts the feature quantity by using a virtual viewpoint at which the target is just viewed from above, and analysis is performed in the feature quantity analysis unit A 1106. The feature quantity conversion unit B 1107 converts the feature quantity by using a virtual viewpoint at which the target is just viewed from a lateral side, and analysis is performed in the feature quantity analysis unit B 1108. Thereafter, when the analysis result at the viewpoint at which the target is just viewed from above is considered, a signal for outputting the analysis result of the feature quantity analysis unit A 1106 is given to the control signal 1109. When the analysis result at the viewpoint at which the target is just viewed from a lateral side is considered, a signal for outputting the analysis result of the feature quantity analysis unit B 1108 may be given to the control signal 1109.

Although the embodiment describes the case using the analysis processes of two types, a case using analysis processes of three or more types can be achieved by the same method as described above. In addition, one converted feature quantity may be shared by a plurality of analysis processes.

According to the above characteristic features, in addition to the advantages of the first embodiment, an analysis results can be more preferably presented.

Third Embodiment

Figure 12:
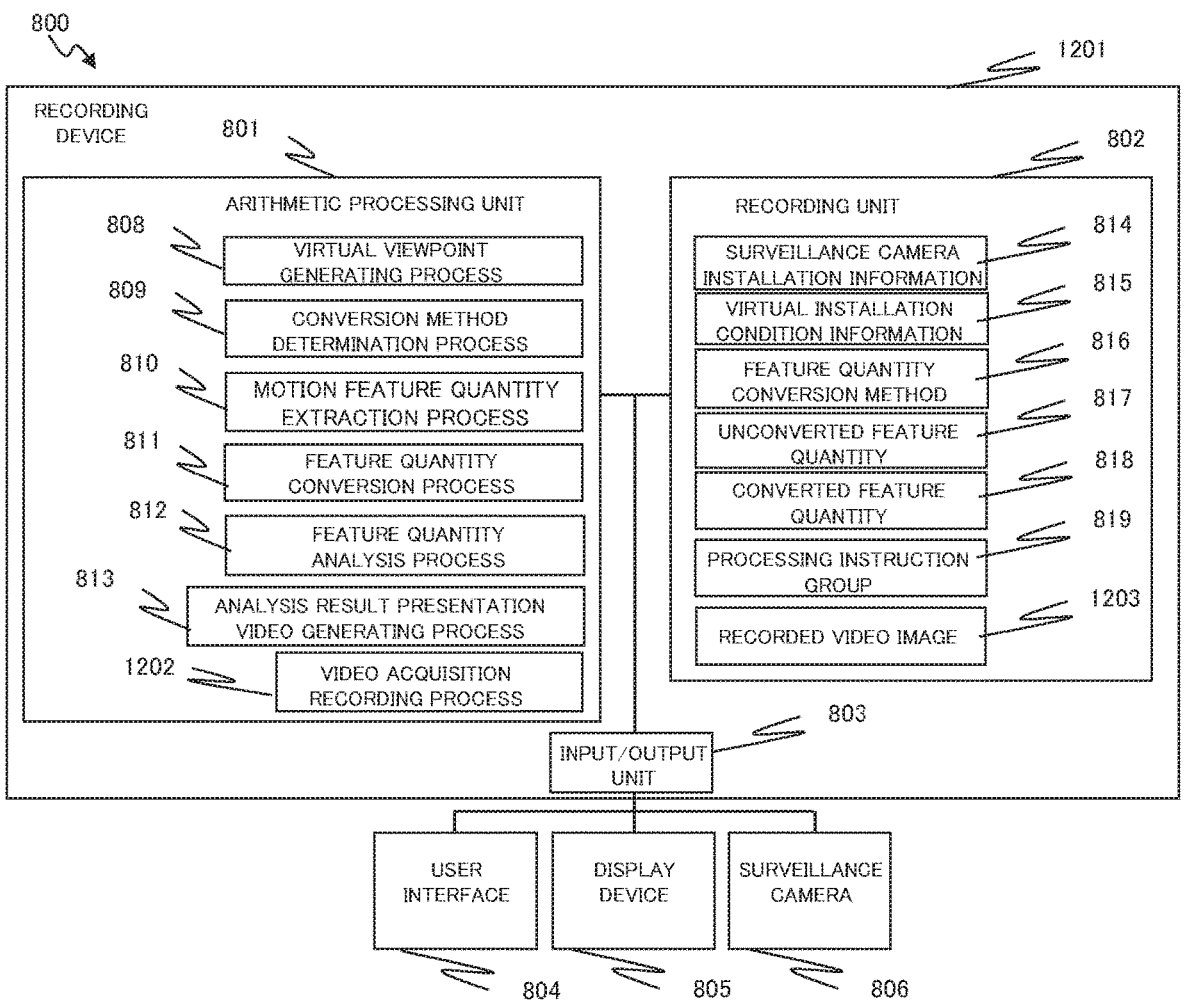
FIG. 12 is a diagram showing a configuration of a video surveillance device according to a third embodiment.

FIG. 12 shows a configuration of a surveillance device 800 according to a third embodiment of the present invention. In the third embodiment, an arithmetic processing unit 801 and a recording unit 802 are disposed in a recording device 1201. Since the other configuration is the same as that in the first embodiment, different points will be mainly described below.

A video acquisition recording process 1202 acquires a video image from the surveillance camera 806 through the input/output unit 803. The acquired video image is converted into a video image of a format in which the video image can be stored in the recording unit 802 and stored as a recording video image 1203. In the motion feature quantity extraction process, a video image to be extracted from the recording video image 1203 is acquired and subjected to the motion feature quantity extraction process.

The embodiment describes the example in which the user interface 804 and the display device 805 are disposed outside the recording device 1201. However, the user interface 804 and the display device 805 may be disposed in the recording device.

Fourth Embodiment

Figure 13:
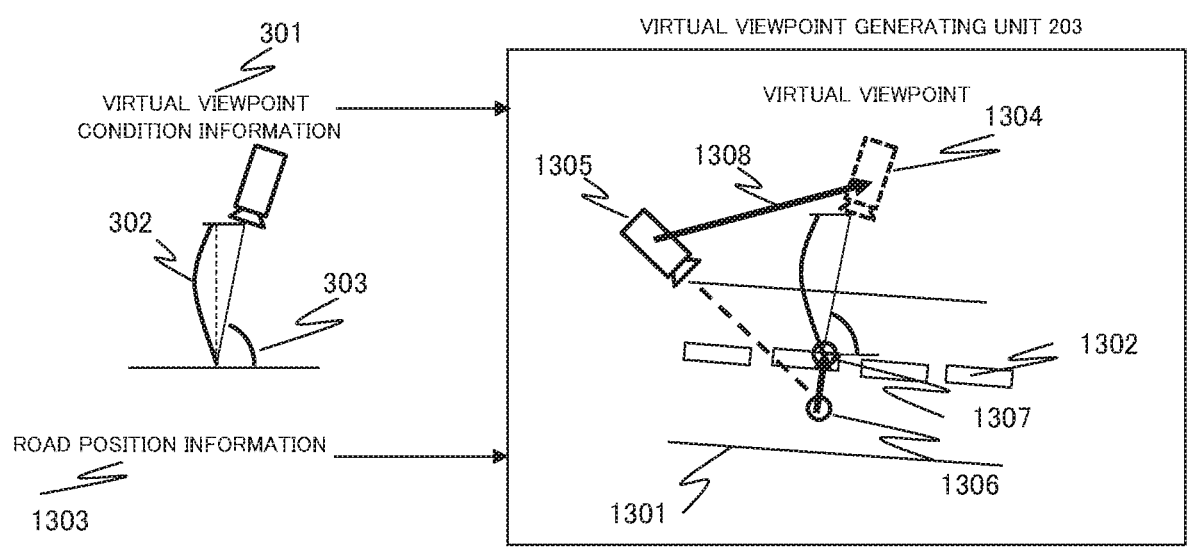
FIG. 13 is a diagram showing a processing of the virtual viewpoint generation unit 203 according to a fourth embodiment.

FIG. 13 is a process of the virtual viewpoint generation unit 203 according to a fourth embodiment of the present invention. The fourth embodiment shows an example of a virtual viewpoint generation method when a surveillance target region of a surveillance camera 1305 is in a special environment such as an outdoor road 1301. Since the other configuration is the same as that in the first embodiment, different points will be mainly described below.

As in FIG. 13, when the surveillance region is the road 1301, when a feature quantity is converted into a feature quantity of a format set in consideration of the relationship to the road, the feature quantity may be more easily handled in the analysis process. Thus, road position information 1303 is acquired from a map database or the like, and the road information 1303 is used to configure a virtual viewpoint 1304. The position of a white line 1302 on the road 1301 is extracted from the road position information 1303, and a virtual viewpoint is determined such that the white line 1302 is at the center of the sight line of the virtual viewpoint. In determination of the virtual viewpoint, a crossing point 1306 between the sight line of the camera and the ground level is calculated from installation information of each of the surveillance cameras 1305. A point 1307 on the white line 1302 closest to the calculated crossing point 1306 is calculated. Of installation positions of cameras each having a sight line the center of which is the point 1307, a position having a height equal to a height 302 from the ground level in the virtual installation state 301 and having an angle equal to an angle 303 from the ground level in the virtual installation state 301 is defined as the virtual viewpoint 1304. A difference between the virtual viewpoint 1304 and the installation position of the camera 1305 is a translational moving distance 1308 from the camera 1305 to the virtual viewpoint 1304. In this case, although the position information of the white line 1302 is extracted from the road position information 1303, the position information may be automatically extracted from a surveillance video image by image processing using hough transformation or the like.

As described above, when virtual viewpoints for all the cameras are set to obtain the advantages of the first embodiment and to convert the feature quantities obtained from all the cameras into feature quantities of a format associated with the road. For this reason, in the analysis process, the feature quantities can be easily handled.

The present invention is not limited to the embodiments, and includes various modifications. The embodiment describes the present invention in detail to understandably explain the present invention, and the embodiments need not always include all the configurations described above. Furthermore, the configuration of a certain embodiment can also be partially replaced with the configuration of another embodiment. The configuration of another embodiment can also be added to the configuration of a certain embodiment. With respect to some configuration of the embodiments, another configuration can also be added, deleted, and replaced.

Some or all of the configurations, the functions, the processing units, the processing means, and the like may be achieved with hardware by being designed with, for example, integrated circuits. The configurations, the functions, and the like may be achieved with software by interpreting and executing programs to achieve the functions by the processor. Information such as programs, tables, and files to achieve the functions can be stored in recording devices such as a memory, a hard disk, and an SSD (Solid State Drive) and recording media such as an IC card, an SD card, and a DVD.

REFERENCE SIGNS LIST

101 . . . surveillance target,
102 . . . surveillance camera,
104 . . . motion feature quantity,
106 . . . virtual installation state,
107 . . . virtual viewpoint,
109 . . . converted motion feature quantity,
111 . . . database,
200 . . . video surveillance device,
201 . . . virtual installation state information,
202 . . . surveillance camera installation information,
203 . . . virtual viewpoint generation unit,
204 . . . conversion method determination unit,
205 . . . video image from surveillance camera,
206 . . . motion feature quantity extraction unit,
207 . . . feature quantity conversion unit,
208 . . . feature quantity analysis unit,
209 . . . analysis result presentation unit,
210 . . . virtual viewpoint information,
211 . . . conversion method,
801 . . . arithmetic processing device,
802 . . . recording device,
803 . . . input/output device,
804 . . . user interface,
805 . . . display device,
806 . . . surveillance camera,
807 . . . recording device,
901 . . . video analysis server,
902 . . . surveillance monitor,
904, 906, 909 . . . network,
907 . . . virtual installation state information setting client,
1001 . . . virtual installation state input window.

The invention claimed is:

1. A video surveillance system comprising:
a plurality of cameras that capture video images;
a processor programmed to execute programs stored in a memory, the processor being programmed to
generate virtual viewpoint information for each of the plurality of cameras based on virtual installation state information and surveillance camera installation information of the plurality of cameras;
receive the video images from the plurality of cameras and extract motion feature quantities from a plurality of frames constituting the video images;
determine a method for converting the motion feature quantities based on the virtual viewpoint information, the method including converting from a three-dimensional position in a real space into a two-dimensional coordinate position of a virtual image viewed from a virtual viewpoint or converting a histogram by using a conversion table associated with information of a height of a feature quantity from a ground level;
convert the extracted motion feature quantities based on the determined method for converting the motion feature quantities; and
analyze the converted motion feature quantities;
retain virtual coordinate axes different from three-dimensional coordinate axes of the plurality of cameras and calculate virtual viewpoints on a two-dimensional virtual coordinate system to convert the extracted motion feature quantities;
calculate a position of a crossing point between a sight line axis of each of the plurality of cameras and the ground level based on installation information of the plurality of cameras, and generate, for each of the plurality of cameras, a position at which a virtual installation state of the camera is matched with an actual installation state of the camera as the virtual viewpoint; and extract a position of a white line from input road information, calculate a point on the white line closest to the crossing point, and, of positions of the plurality of cameras each sight line the center of which is the point on the white line, generate a position at which a virtual installation state of a camera is matched with an actual installation state of the camera as a virtual viewpoint; and
a database in which extraction results are stored.

2. The video surveillance system according to claim 1, wherein the processor is further programmed to:
estimate a three-dimensional position of the motion feature quantity in a real space;
determine a conversion method used in conversion of the motion feature quantity by using the virtual viewpoint; and
perform coordinating conversion of the motion feature quantity by using the estimated three-dimensional position and the determined conversion method.

3. The video surveillance system according to claim 2, further comprising:
a display on which an analysis result is displayed, and wherein
the analysis result is switched by a control signal.

4. The video surveillance system according to claim 1, further comprising
a user interface for setting the virtual viewpoint.

5. A video surveillance method in a video surveillance system including a plurality of cameras that capture video images and a processor programmed to execute programs stored in a memory to execute the method comprising:
an extraction step of receiving video images from the plurality of cameras and extracting motion feature quantities from a plurality of frames constituting the video images;
a generation step of generating virtual viewpoint information for each of the plurality of cameras based on virtual installation state information and surveillance camera installation information of the plurality of cameras;
a storage step of accumulating extraction results from the extraction step;
a determination step of determining a conversion method for converting the motion feature quantities based on the virtual viewpoint information, the conversion method including converting from a three-dimensional position in a real space into a two-dimensional coordinate position of a virtual image viewed from a virtual viewpoint or converting a histogram by using a conversion table associated with information of a height of a feature quantity from a ground level;
a conversion step of converting the extracted motion feature quantities based on the determined method for converting the motion feature quantities; and
an analysis step of analyzing the converted motion feature quantities, wherein
the conversion step retains virtual coordinate axes different from three-dimensional coordinate axes of the plurality of cameras and calculates virtual viewpoints on a two-dimensional virtual coordinate system to convert the extracted motion feature quantities,
the conversion step calculates a position of a crossing point between a sight line axis of each of the plurality of cameras and a ground level based on installation information of the plurality of cameras, and generates, for each of the plurality of cameras, a position at which a virtual installation state of the camera is matched with an actual installation state of the camera as the virtual viewpoint, and
wherein a position of a white line is extracted from input road information, a point on the white line closest to the crossing point is calculated, and, of positions of the plurality of cameras each sight line the center of which is the point on the white line, a position at which a virtual installation state of a camera is matched with an actual installation state of the camera is generated as a virtual viewpoint.

6. The video surveillance method according to claim 5, wherein
the conversion step further includes:
a three-dimensional position estimation step of estimating a three-dimensional position of the motion feature quantity extracted in the extraction step in a real space;
a conversion method determination step of determining a conversion method used in conversion of the motion feature quantity by using the virtual viewpoint; and
a coordinate conversion step of performing coordinate conversion of the motion feature quantity by using the estimated three-dimensional position and the determined conversion method.

7. The video surveillance method according to claim 6, further comprising:
a plurality of conversion steps; and
a presentation step of presenting an analysis result from the analysis unit, and wherein
the analysis result presented in the presentation step is switched by a control signal.

8. A computer readable information recording medium on which a program to cause a computer to achieve the following steps:
an extraction step of receiving video images from a plurality of cameras and extracting motion feature quantities from a plurality of frames constituting the video images;
a generation step of generating virtual viewpoint information for each of the plurality of cameras based on virtual installation state information and surveillance camera installation information of the plurality of cameras;
a storage step of accumulating extraction results from the extraction step;
a determination step of determining a method for converting the motion feature quantities based on the virtual viewpoint information, the method including converting from a three-dimensional position in a real space into a two-dimensional coordinate position of a virtual image viewed from a virtual viewpoint or converting a histogram by using a conversion table associated with information of a height of a feature quantity from a ground level;
a conversion step of converting the extracted motion feature quantities based on the determined method for converting the motion feature quantities; and
an analysis step of analyzing the converted motion feature quantities, wherein
the conversion step retains virtual coordinate axes different from three-dimensional coordinate axes of the plurality of cameras and calculates virtual viewpoints on a two-dimensional virtual coordinate system to convert the extracted motion feature quantities,
the conversion step calculates a position of a crossing point between a sight line axis of each of the plurality of cameras and a ground level based on installation information of the plurality of cameras, and generates, for each of the plurality of cameras, a position at which a virtual installation state of the camera is matched with an actual installation state of the camera as the virtual viewpoint, and wherein a position of a white line is extracted from input road information, a point on the white line closest to the crossing point is calculated, and, of positions of the plurality of cameras each sight line the center of which is the point on the white line, a position at which a virtual installation state of a camera is matched with an actual installation state of the camera is generated as a virtual viewpoint.

9. The information recording medium according to claim 8, wherein the conversion step further includes:

a three-dimensional position estimation step of estimating a three-dimensional position of the motion feature quantity extracted in the extraction step in a real space;

a conversion method determination step of determining a conversion method used in conversion of the motion feature quantity by using the virtual viewpoint; and a coordinate conversion step of performing coordinate conversion of the motion feature quantity by using the estimated three-dimensional position and the determined conversion method.

* * * * *